United States Patent
Tank et al.

[11] Patent Number: 6,055,886
[45] Date of Patent: May 2, 2000

[54] DRILL BLANK

[76] Inventors: Klaus Tank, 9 Warbleton Avenue, Essexwold, Johannesburg; Iakovos Sigalas, 112 Third Street, Linden, Johannesburg, both of South Africa

[21] Appl. No.: 09/039,005

[22] Filed: Mar. 13, 1998

[30] Foreign Application Priority Data

Mar. 17, 1997 [ZA] South Africa .......................... 97/2282

[51] Int. Cl.⁷ ............................................... B21K 5/04
[52] U.S. Cl. ........................... 76/108.1; 76/DIG. 11; 76/DIG. 12; 76/101.1; 428/408
[58] Field of Search ................... 76/108.1, 101.1, 76/108.2, DIG. 11, DIG. 12; 75/240, 230, 243; 419/49, 18, 5, 8; 428/33, 408

[56] References Cited

U.S. PATENT DOCUMENTS

| | | | |
|---|---|---|---|
| 4,629,373 | 12/1986 | Hall | 76/101.1 X |
| 4,694,710 | 9/1987 | Phaal | 76/108.1 |
| 4,724,728 | 2/1988 | Phaal | 76/108.1 |
| 4,748,088 | 5/1988 | Billgren | 428/558 |
| 5,299,471 | 4/1994 | Tank et al. | 76/108.1 |

FOREIGN PATENT DOCUMENTS 0251130  10/1988  Japan ..................................... 76/108.1

*Primary Examiner*—Rinaldi I. Rada
*Assistant Examiner*—Boyer Ashley
*Attorney, Agent, or Firm*—Scully, Scott, Murphy & Presser

[57] ABSTRACT

A drill blank, particularly a blank for a micro-drill, comprises an elongate cylindrical cemented carbide body, having flat end surfaces, a recess formed in one end surface and taking the form of an island in that surface wholly surrounded by cemented carbide, and an abrasive compact located in the recess, bonded to a cemented carbide, and presenting a surface coincident with the carbide end surface in which the recess is located. A drill may be formed from the drill blank by suitably shaping the cemented carbide body, for example, by fluting, in the region of the abrasive compact to expose the abrasive compact.

6 Claims, 1 Drawing Sheet

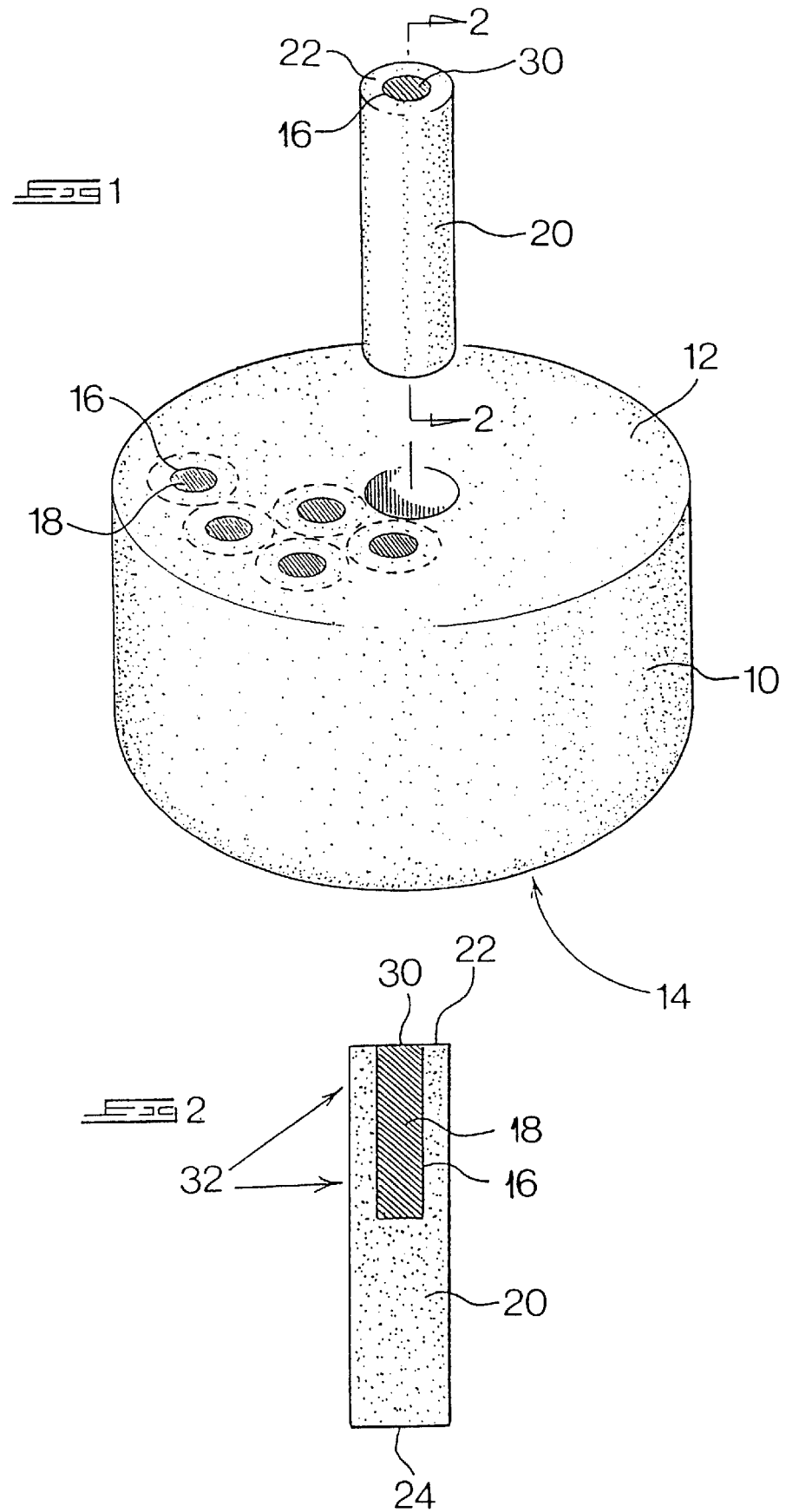

DRILL BLANK

BACKGROUND OF THE INVENTION

This invention relates to a drill blank and more particularly a micro-drill blank.

In the manufacture of various products, particularly printed circuit boards, it is necessary to form a plurality of small holes therein. These holes are generally formed by means of a small diameter twist drill or micro-drill. Since such boards are abrasive, for example made of fibre reinforced plastic, it has been found that drill bits tipped with diamond abrasive compact are particularly suitable.

Various methods have been described in the literature for producing micro drills. EP 0 206 652 describes a method of producing a blank for a drill bit comprising providing a composite abrasive compact having a diamond or cubic boron nitride compact bonded to a cemented carbide backing and having major surfaces on each of opposite sides thereof, severing the composite abrasive compact along planes perpendicular to the flat surfaces and from one flat surface to the other to produce a plurality of sticks polygonally-shaped end-on, each severed plane defining side surfaces of adjacent sticks and longitudinally rounding each stick to produce from it a blank for a drill bit which is round end-on. The drills may be made by fluting the rounded stick.

EP 0 223 474 describes a method of making a drill blank comprising a cylindrical carbide body having a vein of abrasive compact embedded in a groove at one end thereof and bonded to the carbide. The method includes the steps of providing a solid, cylindrical body of cemented carbide having end surfaces joined by a side surface, forming a series of grooves in one end surface, placing compact-forming material in the grooves, exposing the cylindrical body to temperature and pressure conditions suitable to produce an abrasive compact of the material in the grooves and severing the cylindrical body longitudinally from one end surface to the opposite end surface to produce a plurality of drill blanks. The drills are again produced from such blanks by fluting.

The drill blanks described above all utilise abrasive compact at the working end thereof. Abrasive compact, which may be diamond or cubic boron nitride abrasive compact, is extremely hard and abrasion resistant. Consequently, if, as happens in fluting the blank, much abrasive compact has to be removed, the cost of the drill bit itself increases. In both of the methods described above, the abrasive compact extends from one side surface of the blank to the other creating a situation in which quite a bit of abrasive compact has to be removed in fluting the blank.

Other methods of making micro drill bits are known. Some of these methods, e.g. that described in EP 0 132 652, involve various bonding steps which again adds to the cost. The bonded regions also introduce potential zones of weakness.

SUMMARY OF THE INVENTION

According to the present invention, a drill blank, particularly a blank for a micro drill, comprises an elongate cylindrical cemented carbide body, having flat end surfaces, a recess formed in one end surface and taking the form of an island in that surface wholly surrounded by cemented carbide, and an abrasive compact located in the recess, bonded to the cemented carbide and presenting a surface coincident with the carbide end surface in which the recess is located.

A drill may be formed from the drill blank described above by suitably shaping the cemented carbide body, e.g. by fluting in the region of the abrasive compact to expose the compact. Such shaping will include removal of the cemented carbide, a material much less abrasive than abrasive compact. A certain amount of shaping of the abrasive compact located in the recess will be necessary. However, substantial removal of abrasive compact in such shaping is not necessary.

Further according to the invention, a method of producing a drill blank as described above includes the steps of providing a cylindrical cemented carbide body having flat end surfaces, forming a plurality of discrete recesses in at least one of the flat surfaces, filling each recess with compact-forming material, subjecting the cemented carbide body with the filled recesses to elevated temperature and pressure conditions suitable to form an abrasive compact of the compact-forming material, and severing the cylindrical cemented carbide body longitudinally from one end surface to the other to produce a plurality of the drill blanks.

Severing of the cemented carbide body may be achieved by methods known in the art such as laser cutting or spark erosion.

The invention has particular application to drill blanks for micro-drills.

DESCRIPTION OF THE DRAWINGS

FIG. 1 is a perspective view of a cemented carbide body which may be utilised to produce a drill blank of the invention; and FIG. 2 is a section along the line 2—2 of FIG. 1.

DESCRIPTION OF EMBODIMENTS

The drill blank will generally have a circular cross-section, although other cross-sections such as hexagonal or square are possible. The length to width i.e. longest transverse dimension, ratio of the drill blank will typically be in the range 5:1 to 25:1.

The recess will generally be located parallel to, or in, the longitudinal axis of the body and is preferably centrally located in the body.

The abrasive compact which is utilised in the drill blank of the invention may be a diamond or cubic boron nitride compact. Such compacts are well known in the art and are described extensively in the literature. Also, the methods by which these compacts may be made and the materials which are utilised in their manufacture are also well known.

In the case of diamond compacts, the compact-forming material will generally be diamond particles alone, or a mixture of diamond particles with a bonding matrix such as cobalt, nickel or iron in particulate form. The compact-forming material may also be a layer of diamond particles on a layer of one or more of these bonding matrices.

In the case of cubic boron nitride compacts, the compact-forming material may be the cubic boron nitride particles alone, or a mixture of these particles with a bonding matrix such as aluminium or other such metal or nitride thereof in particulate form.

The conditions necessary to produce a compact from suitable compact-forming materials are similar to those which are used for synthesising the particular abrasive particle used. These conditions are typically pressures of the order of 50 to 70 kilobars (50 to $70 \times 10^5$ KPa) and temperatures of the order of 1400 to 1600° C.

The cemented carbide may be any known in the art such as cemented tungsten carbide, cemented titanium carbide, cemented molybdenum carbide, cemented tantalum carbide or mixtures thereof. As is known in the art, such carbides comprise a mass of carbide particles bonded into a coherent, hard form by means of a bonding metal such as iron, cobalt, nickel or an alloy containing one or more of these metals.

An embodiment of the invention will now be described with reference to the accompanying drawings.

Referring to these drawings, a cylindrical cemented carbide body 10 is provided. This body 10 has flat end surfaces 12, 14. The cemented carbide may be any known in the art and is typically cemented tungsten carbide.

A plurality of discrete recesses or cavities 16, of circular cross-section, are formed in the end surface 12. These recesses may take any suitable shape such as right-circular cylindrical and are filled with abrasive compact forming material 18.

The cemented carbide body with the filled recesses is then placed in a reaction capsule which itself is placed in the reaction zone of a conventional high temperature/high pressure apparatus. The contents of the capsule are exposed to elevated temperature and pressure conditions suitable to form an abrasive compact of the compact-forming material. The compact is simultaneously bonded to the cemented carbide during its formation.

The cemented carbide body 10 is then removed from the apparatus and capsule. This body has a plurality of recesses in which an abrasive compact fills each recess and is bonded to the cemented carbide body.

A plurality of drill blanks may now be produced by severing the body 10 from one end surface 12 to the other surface 14, as shown by the dotted lines in FIG. 1. The severing will be such that each abrasive compact-filled recess lies wholly within the cylindrical body which is produced. The recess is centrally located in the body and is located parallel to the longitudinal axis of the body. Thus, each drill blank comprises an elongate cylindrical cemented carbide body 20 having end surfaces 22, 24. In one end surface 22 there is formed the recess 16 containing abrasive compact 18. This abrasive compact 28 is bonded to the elongate body 20 and presents a surface 30 in the end 22.

Examples of typical length to diameter ratios of the drill blanks are 10:1 and 20:1.

A drill may be produced from the blank by fluting the cemented carbide body 20. It will also be necessary to shape, to a limited extent, the abrasive compact 18. However, extensive removal of abrasive compact, as is necessary in many prior art methods, is not required. The bulk of the material being removed in the fluting is cemented carbide in the region 32 which is much less abrasive than abrasive compact.

In the embodiment described above and illustrated in the drawings, a plurality of recesses are formed in one flat end surface only of the cemented carbide body. Such recesses can be formed in both flat end surfaces 12, 14 and filled with compact forming material. When the recesses are in register, severing of the cemented carbide body in the same manner as described above, produces an elongate unit which can be severed intermediate the ends and transverse to the longitudinal axis of the unit to produce two drill blanks.

We claim:

1. A drill blank comprises an elongate cylindrical cemented carbide body having flat end surfaces, a recess formed in one end surface of said carbide body and having the peripheral surface of said recess surrounded by cemented carbide, and an abrasive compact located in the recess, bonded to the cemented carbide and presenting an exposed surface coincident with the carbide body end surface in which the recess is located.

2. A drill blank according to claim 1 which is configured so as to constitute a blank for a micro-drill.

3. A drill blank according to claim 1 wherein a ratio of the length to longest transverse dimension of the cemented carbide body is in the range 5:1 to 25:1.

4. A drill blank according to claim 1 wherein the recess is located parallel to, or in, a longitudinal axis of the carbide body.

5. A drill blank according to claim 1 wherein the recess is centrally located in the cemented carbide body.

6. A drill blank according to claim 1 wherein the abrasive compact is a diamond abrasive compact.

* * * * *